United States Patent [19]
Kovacs et al.

[11] Patent Number: 5,995,543
[45] Date of Patent: Nov. 30, 1999

[54] CONSTRAINED FIXED DELAY TREE SEARCH RECEIVER FOR A MTR=2 ENCODED COMMUNICATION CHANNEL

[75] Inventors: Janos Kovacs, N. Andover, Mass.; Jack Kenney, Lawrenceville, N.J.

[73] Assignee: STMicroelectronics N.V., Netherlands

[21] Appl. No.: 08/885,978

[22] Filed: Jun. 30, 1997

[51] Int. Cl.$^6$ ................................................. H03D 1/00
[52] U.S. Cl. ........................ 375/230; 375/340; 375/350; 341/59
[58] Field of Search ..................... 375/340, 232, 375/233, 350, 341, 259, 229, 230, 348; 341/59; 348/607

[56] References Cited

U.S. PATENT DOCUMENTS

| | | | |
|---|---|---|---|
| 5,321,512 | 6/1994 | Huang | 348/607 |
| 5,446,758 | 8/1995 | Eyuboglu | 375/259 |
| 5,487,085 | 1/1996 | Wong-Lam et al. | 375/230 |
| 5,513,216 | 4/1996 | Gadot et al. | 375/233 |
| 5,546,430 | 8/1996 | Liao et al. | 375/341 |
| 5,604,769 | 2/1997 | Wang | 375/229 |
| 5,692,011 | 11/1997 | Nobakht et al. | 375/233 |
| 5,859,601 | 1/1999 | Moon et al. | 341/59 |
| 5,892,801 | 4/1999 | Schneider | 375/348 |

*Primary Examiner*—Don N. Vo
*Assistant Examiner*—Dac V. Ha
*Attorney, Agent, or Firm*—Brian J. Colandreo; Theodore E. Galanthay; Lisa K. Jorgenson

[57] ABSTRACT

A constrained fixed delay tree search receiver for an MTR=2 encoded communication channel includes a filter circuit responsive to a received signal for producing a channel impulse response including a plurality of filtered samples with at least one of the post cursor filter samples forced to zero; a feedback equalizer circuit responsive to the channel symbol identified at the output of the receiver and the filtered samples for producing corresponding truncated samples comprised of linear combinations of coefficients characterizing the channel and channel symbols constrained by the MTR=2 code; and a detector including a discrete time filter responsive to the truncated samples for generating a set of signals defining a multi-segment boundary which divides the combination of the set of signals into two groups; a comparator circuit responsive to the discrete time filter for determining to which of the groups the combination of the set of signals belongs, and a logic circuit, responsive to the comparator circuit, for determining the value of a channel symbol as a function of the group in which the set of symbols belongs.

4 Claims, 6 Drawing Sheets

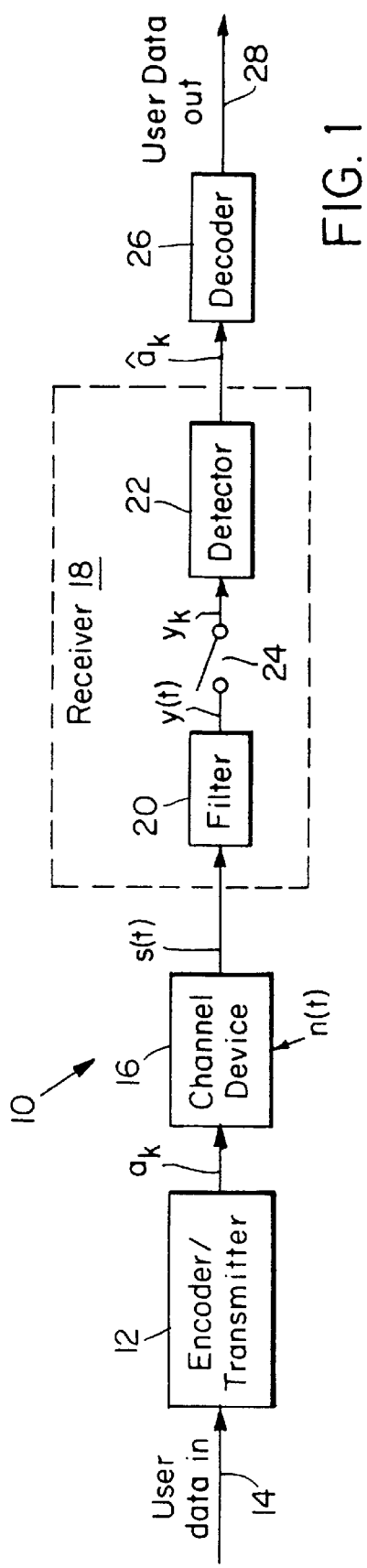
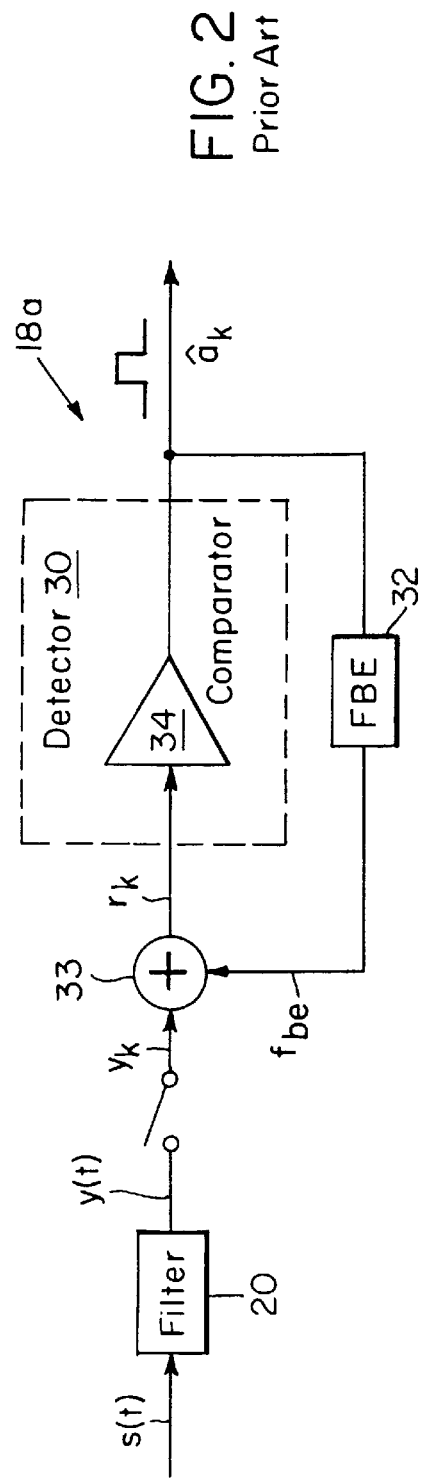

CONSTRAINED FIXED DELAY TREE SEARCH RECEIVER FOR A MTR=2 ENCODED COMMUNICATION CHANNEL

FIELD OF INVENTION

This invention relates to a constrained fixed delay tree search receiver for a MTR=2 encoded communication channel.

BACKGROUND OF INVENTION

Sample channel processors are frequently used in signal processing circuits to enable accurate reading of high frequency signals of devices such as communication channels (modems), disk drive read channels, CD ROMs, and recording channels. These systems essentially consist of an encoder/transmitter which receives data input comprising a series of state transitions, and the channel which receives the encoded data input and frequently introduces unwanted distortions and noise. The channel output is delivered to a filter which removes noise and samples the encoded signal, after which a detector determines whether a signal transition has occurred based on the samples taken from the filter, and a decoder provides data output based on the detected signal. For successful data transmission, the data output should be the same as the data input. The effectiveness of the data transmission depends on how accurately the sampled data represents the actual input data signal.

As technological advances enable devices to operate at increased data rates, the transitions occur closer together in time, making it more difficult to filter out channel noise and retain the integrity of the original input data signal based on the data samples taken. A number of prior art methods have been developed to overcome this problem.

One simple approach to overcoming this problem is to use a Decision Feedback Equalizer (DFE). A Decision Feedback Equalizer (DFE) uses one data sample to determine whether or not a transition has occurred in the input data signal. A DFE circuit essentially consists of a filter, an adder, a detector (usually a comparator) and a feedback equalizer. The filter concentrates the energy of the input signal so that the amplitude of the signal exceeds a predetermined detection threshold, and takes one sample from the incoming signal. The remaining signal information is discarded. The comparator looks at the amplitude of the sample and detects whether or not the sample has exceeded the predetermined threshold, indicating that a state transition has occurred. The feedback equalizer responds to the output of the detector, adding a feedback signal to the input of the comparator, thus incorporating signal information from the previous sample into the processing of the current sample. Problems with this technique include loss of important signal information because of the reliance on only one sample and distortion of the input signal.

A more complicated but more accurate method of overcoming the problem of retaining data integrity at high data rates is the Fixed Delay Tree Search (FDTS) detector. A Fixed Delay Tree Search (FDTS τ=2) detector uses samples to make a decision as to whether a signal bit has been detected. The three samples are taken at predetermined intervals and include a current sample and the two previous samples. The advantage to this approach is that a more accurate decision can be made since more samples are used. The disadvantage to this approach is that keeping track of all the samples requires more circuitry including more comparators, adders and multipliers.

SUMMARY OF INVENTION

It is therefore an object of this invention to provide an improved receiver for an encoded communication channel.

It is a further object of this invention to provide such a receiver which eliminates the need for multipliers.

It is a further object of this invention to provide such a receiver which is faster.

It is a further object of this invention to provide such a receiver which requires less power.

It is a further object of this invention to provide such a receiver which has a better bit error rate at a given signal to noise ratio (SNR) than an extended partial response class four channel (EPR4).

It is a further object of this invention to provide such a receiver which performs as well as a three-dimensional fixed delay tree search (FDTS τ=2).

It is a further object of this invention to provide such a receiver which does not discard useful signal energy needed for the decision process.

It is a further object of this invention to provide such a receiver which requires significantly fewer operations.

This invention results from the realization that a much simpler and yet accurate receiver for a communications channel can be effected by forcing the $b_2$ coefficient to zero and constraining the channel to an MTR=2 code to reduce the number of logic states and statements, thereby simplifying the required detector circuit and eliminating the need for more costly components like multipliers while preserving the accuracy of a full tree search detector.

This invention features a constrained fixed delay tree search receiver for an MTR=2 encoded communication channel. There is a filter circuit responsive to the receive signal for producing a channel impulse response including a plurality of filtered samples with at least one of the post cursor filter samples forced to zero. A feedback equalizer circuit responsive to the channel symbol identified at the output of the receiver and the filtered samples produces corresponding truncated samples comprised of linear combinations of coefficients characterizing the channel and channel symbols constrained by the MTR=2 code. A detector including a discrete time filter responsive to the truncated samples generates a set of signals defining a multi-segment boundary which divides the combination of the set of signals into two groups. There is a comparator circuit responsive to the discrete time filter for determining to which of the groups the combination of the set of signals belongs, and a logic circuit, responsive to the comparator circuit, for determining the value of a channel symbol as a function of groups in which the set of symbols belongs.

In a preferred embodiment there may be three truncated samples and the post cursor truncated sample which is forced to zero may be the most recent truncated sample. The coefficients may include coefficients $b_0$, $b_1$ and $b_2$ in the most recent truncated sample; $b_0$ and $b_1$ in the next most recent truncated sample; and $b_0$ in the least recent truncated sample. The $b_0$ coefficient may be 1 and the $b_2$ coefficient may be zero. The channel symbols may be binary.

DISCLOSURE OF PREFERRED EMBODIMENT

Other objects, features and advantages will occur to those skilled in the art from the following description of a preferred embodiment and the accompanying drawings, in which:

FIG. 1 is a schematic block diagram of a communication channel which may employ a receiver according to this invention;

FIG. 2 is a schematic block diagram of a receiver for the communication channel of FIG. 1 using a conventional Decision Feedback Equalizer (DFE) detector;

Figure 3A:
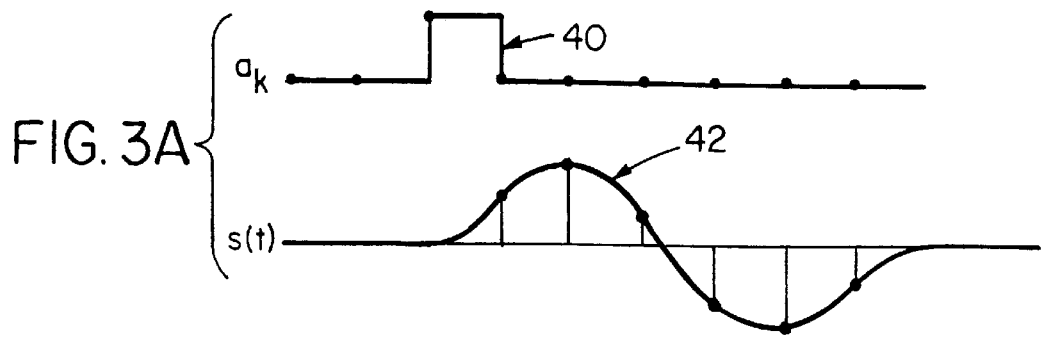
Figure 3B:
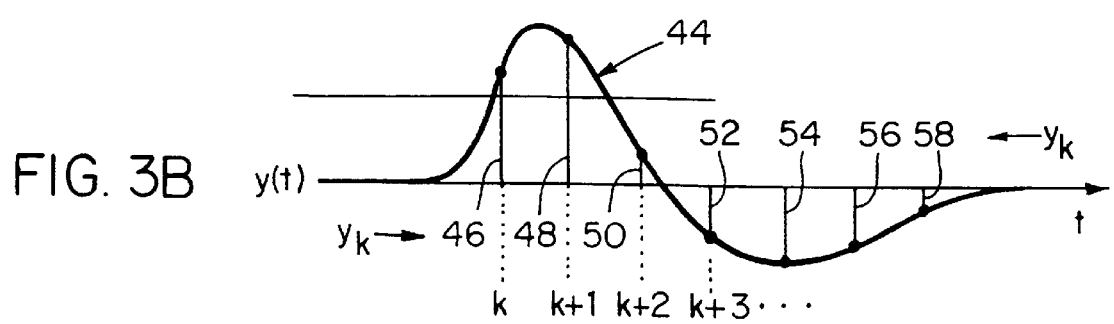
Figure 3C:
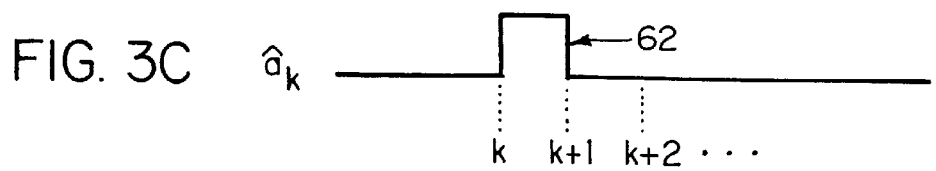
Figure 3D:
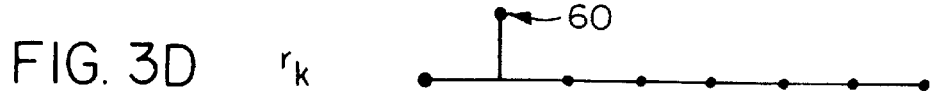
Figure 3E:
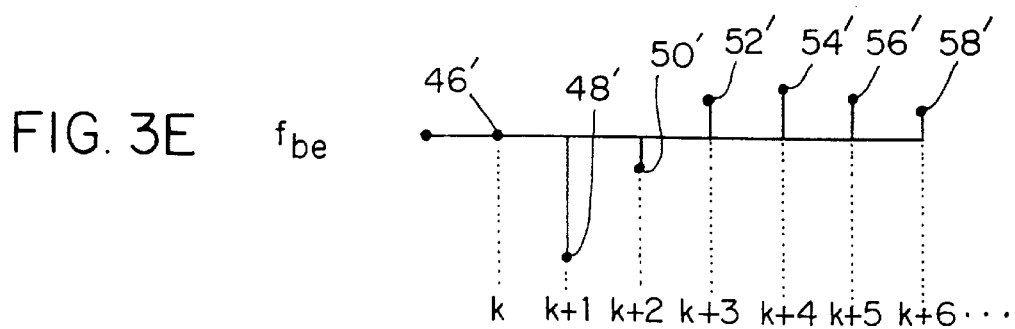
Figure 4:
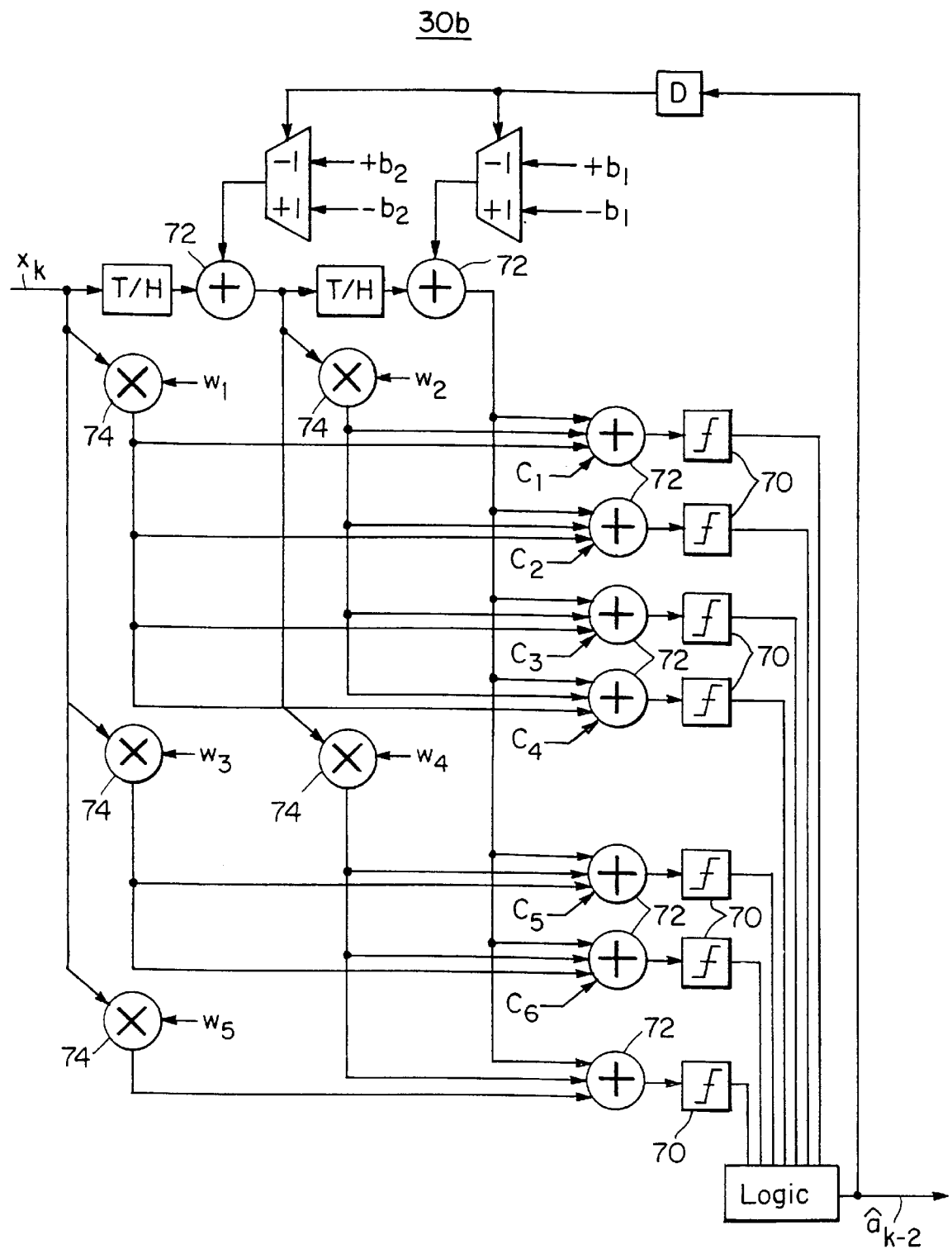
Figure 5A:
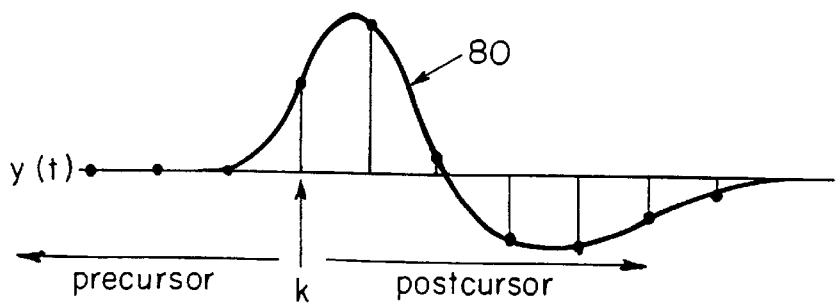
Figure 5B:
Figure 5C:
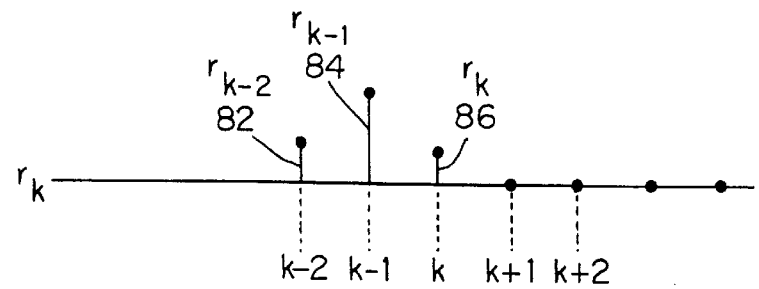
Figure 5D:
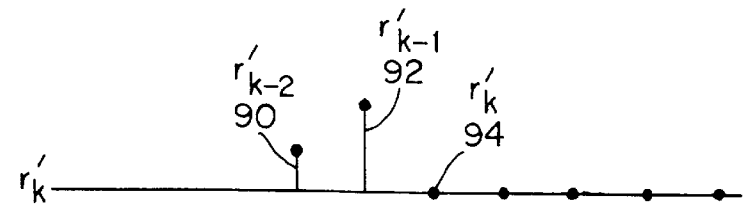
Figure 6:
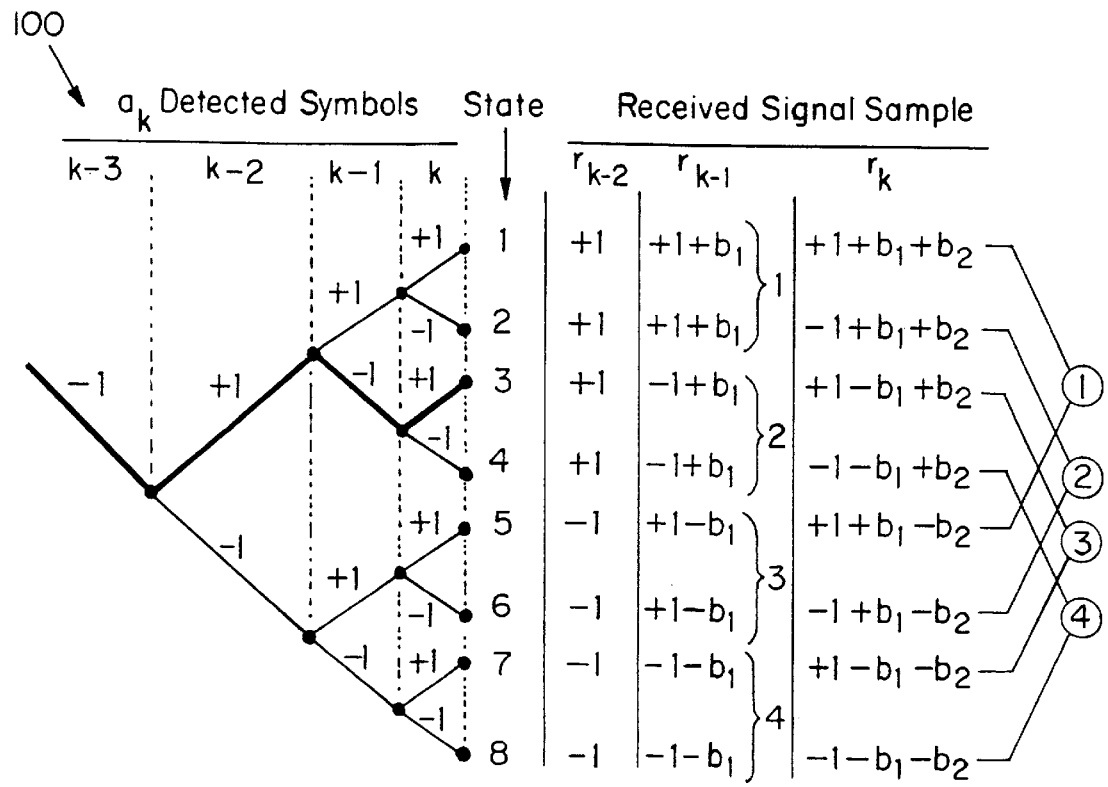
Figure 7:
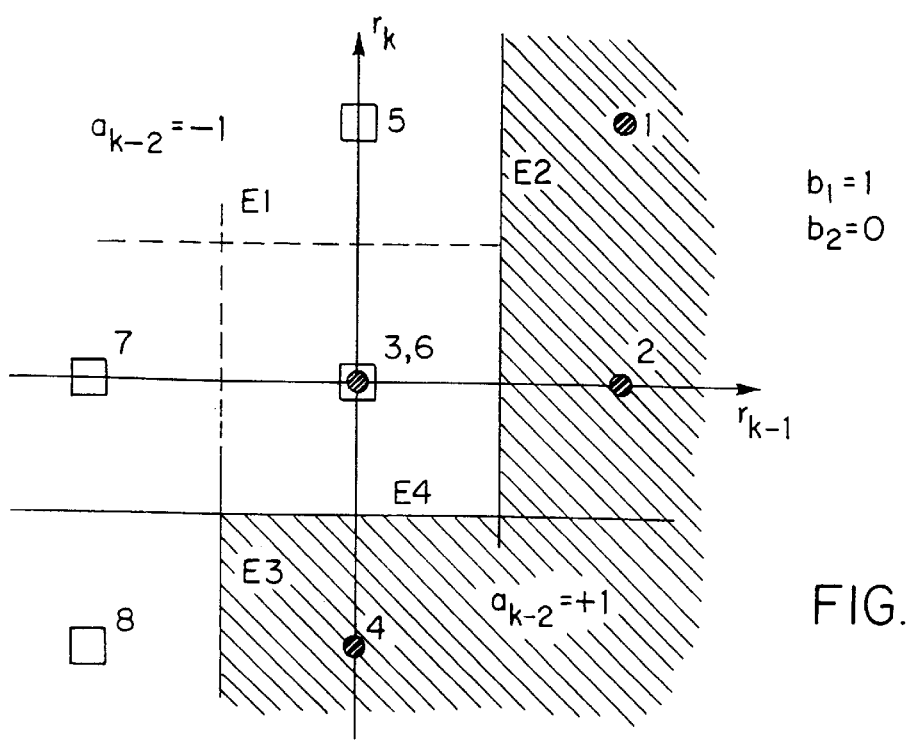
Figure 8:
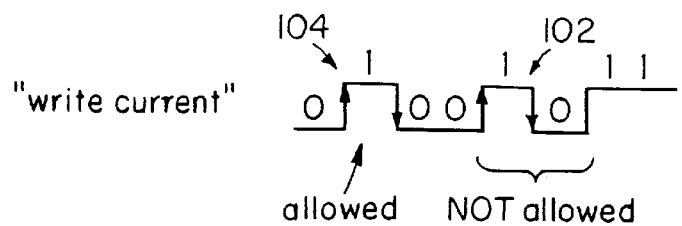
Figure 9:
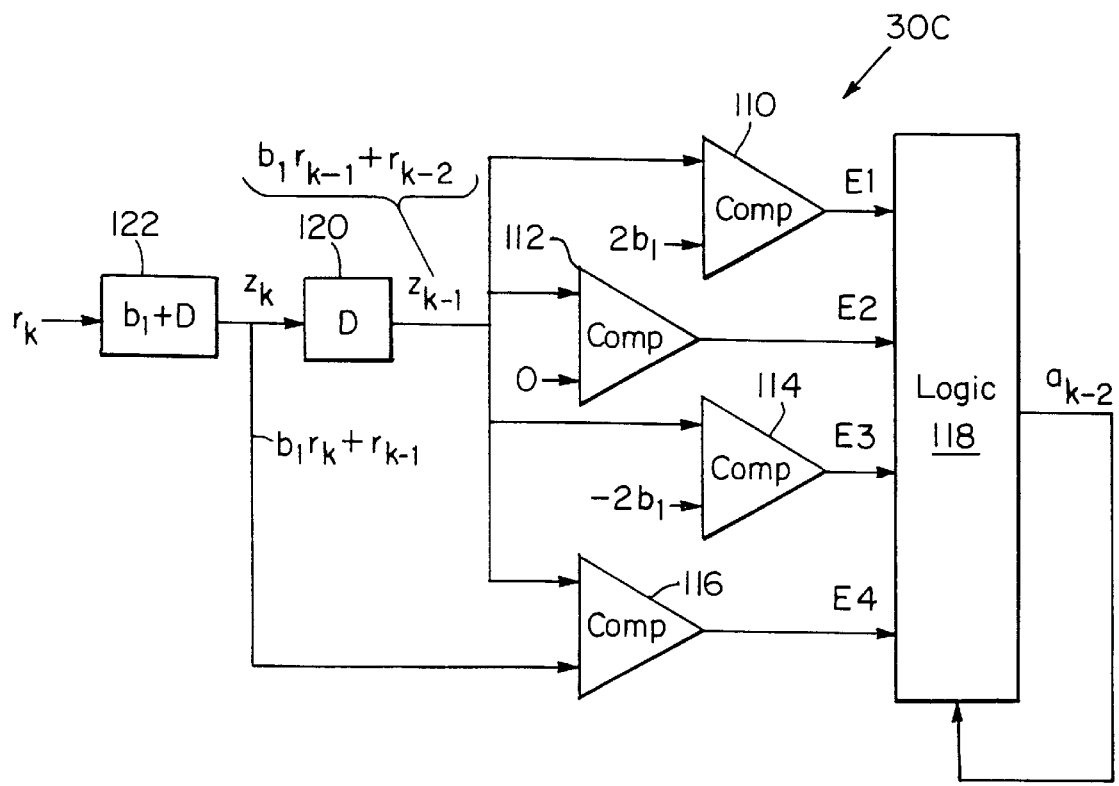

FIGS. 3A–E illustrate a number of waveforms associated with the operation of the DFE of FIG. 2;

FIG. 4 is a schematic block diagram of a receiver for the communication channel of FIG. 1 using a conventional Fixed Delay Tree Search (FDTS) detector;

FIG. 5 illustrates a number of waveforms associated with the operation of the FDTS of FIG. 4;

FIG. 6 illustrates the FDTS tree implemented by the FDTS detector of FIG. 4;

FIG. 7 is a spatial representation of the eight states of the tree of FIG. 6;

FIG. 8 illustrates the allowed and unallowed transitions in a maximum transition (MTR)=2 length code; and FIG. 9 is a schematic block diagram of a detector for a constrained fixed delay tree search receiver according to this invention for an MTR=2 encoded communication channel.

There is shown in FIG. 1 a communications channel 10 which may use the receiver according to this invention. Communications channel 10 includes encoder transmitter 12 which receives the user data at its input 14 and provides at its output an encoded signal $a_k$ to the channel device 16 which may be, for example, a communications channel, modem, disk drive read channel, CD ROM or recording channel. At the output of channel device 16 the signal now appears somewhat changed, s(t), and so it is submitted to receiver 18 which includes a received filter 20 and detector 22. The filtered signal y(t) from receive filter 20 is sampled by a sampling device, shown schematically as switch 24, to provide the sample signal $y_k$ to detector 22. Detector 22 then performs logic operations to provide the restored original signal now designated as $â_k$. The output signal $â_k$ is delivered to decoder 26 which provides the restored user data at output 28.

Receiver 18a, FIG. 2, has been implemented in the past using receive filter 20 and detector 30 with feedback equalizer circuit 32 configured as a decision feedback equalizer DFE. Detector 30 includes comparator 34 whose output develops the restored signal $â_k$. $â_k$ actually represents the channel symbol which has been identified and restored. Feedback equalizer circuit 32 responds to that restored channel symbol to produce feedback signal $F_{be}$ which is algebraically summed in summer circuit 33 with the output of sample circuit $y_k$ to produce the input signal $r_k$ 90 to comparator 34.

The operation of the prior art DFE circuit 18a can be better understood with respect to the illustrative waveforms in FIGS. 3A–E. The input signal $a_k$ to channel device 16 in FIG. 1 appears as a pulse 40, FIG. 3A. At the output of the channel device 16, FIG. 1, the signal s(t) appears as a periodic wave shape 42 representing the positive-going and negative-going transitions of pulse 40. After filtering by receive filter 20 the signal y(t) appears as shown at 44, FIG. 3B. Upon sampling, y(t) appears as the sample signals $y_k$, including samples 46, 48, 50, 52, 54, 56 and 58 at sample times k, k+1, k+2, k+3, and so on, respectively. Feedback signal $f_{be}$ is a mirror image of $y_k$ samples 46–58. Sample 46' of $f_{be}$, however, is zero, FIG. 3E. Thus, when the two signals $y_k$ and $f_{be}$ are combined in summing circuit 33, the resulting output signal $r_k$ 60, FIG. 3D, which is shown as a pulse or square wave 62, FIG. 3C, has all of the output samples signals reduced to zero except 46, which is the single sample that is then used in comparator 34 to reconstruct and identify the channel symbol $â_k$ at the output of receiver 18a.

In another prior art implementation, detector 30b, FIG. 4, is constructed as a fixed delay tree search (FDTS) detector, which uses three sample signals instead of one for greater accuracy, but requires much more complex circuitry as shown in FIG. 4. The conventional detector circuit 30b as shown in FIG. 4 will be well understood by those skilled in the art. In addition to seven comparators 70 and nine adders 72, it requires five multipliers 74 and a number of other components.

With detector 30b, FIG. 4, the output y(t) 80, FIG. 5, has a form similar to that shown in FIGS. 3A–E. However, in the FDTS detector 30b, $f_{be}$ includes a complement of signals which leave three samples remaining after the combining of $f_{be}$ and $y_k$ so that the signal $r_k$ into the detector comparator is comprised of three samples: $r_{k-2}$ and $r_{k-1}$, also known as the two precursor values 82, and $r_k$ 86, where $r_k$ 86 is the most recent sample, where $r_{k-1}$ 84 is the previous sample and $r_{k-2}$ 82 is the next previous sample. These three samples are used to reconstruct the output signal $â_{k-2}$ shown in FIG. 4.

The logic tree 100, FIG. 6, actually implemented by the FDTS approach shown in FIGS. 4 and 5 is depicted for four times k, k–1, k–2 and k–3 in FIG. 6. The tree has eight states numbered 1, 2, 3, 4, 5, 6, 7 and 8 at the time k. At that time the three sample values $r_k$, $r_{k-1}$ and $r_{k-2}$ have the values as shown. $r_{k-2}$, for example, in states 1–4, has a value of +1, and in states 5–8 a value of –1. This is so because the $b_0$ coefficient at this point is 1. $r_{k-1}$ has the value $+1+b_1$ for states 1 and 2, $-1+b_1$ for states 3 and 4, $+1-b_1$ for states 5 and 6, and $-1-b_1$ for states 7 and 8. $r_k$ in state 1 has a value of $+1+b_1+b_2$; in state 2, $-1+b_1+b_2$; in state 3, $+1-b_1+b_2$; in state 4, $-1-b_1+b_2$; in state 5, $+1+b_1-b_2$; in state 6, $-1+b_1-b_2$; in state 7, $+1-b_1-b_2$; and in state 8, $-1-b_1-b_2$. In operation, a conventional FDTS tree approach requires that each of the states of the tree be calculated and compared to these values to determine which of these values each of the samples $r_k$, $r_{k-1}$ and $r_{k-2}$ most closely resemble, and thus is chosen as the channel symbol which will be identified.

In accordance with this invention, it was realized that if the $r_k$ term 86 in FIG. 5 were simply forced to zero by adjusting receive filter 20, then the $b_2$ terms in $r_k$ of the logic tree in FIG. 6 could be entirely eliminated since they would be zero: the $r'_k$ samples appear as $r'_{k-2}$ 90, $r'_{k-1}$ 92 and $r'_k$ 94 is reduced to zero. When this is done it can be seen that a redundancy develops in the values for the calculation of $r_k$. For example, with the removal of the $b_2$ coefficient, the value of $r_k$ for state 1 is the same as that for state 5; the value for state 2 is the same as for state 6; the value for state 3 is the same as for state 7; and the value for state 4 is the same as that for state 8. Thus four calculations are eliminated. In addition, with this streamlining of the values of $r_k$, the values of states 1 and 5 of $r_k$ are the same as the values of states 1 and 2 for $r_{k-1}$; the values for $r_k$ in states 2 and 6 are the same as the value of $r_{k-1}$ for states 3 and 4; the values of $r_k$ for states 3 and 7 are the same as the value of $r_{k-1}$ for states 5 and 6, and the values of $r_k$ for states 4 and 8 are the same as the values of $r_{k-1}$ for states 7 and 8. Thus the necessary calculations have been reduced by twelve, greatly simplifying the circuitry required for the analysis of the tree search logic. However, in addition to this, if the system is constrained to work with the maximum transition length code (MTR) of two, which limits the number of adjacent transitions to simply two, then even further simplicity and reduction in complexity can be effected.

An MTR=2 code scheme is represented in FIG. 8, where it can be seen that if the number of transitions are more than two as shown at 102, FIG. 8, the data is not allowed; if the number of transitions are two or less as shown at 104, the data is allowed. By imposing this constraint on the coding used in the communications channel it can be seen that starting at k–2 in the logic tree of FIG. 6, one can go in the +1 direction directly to the first state with only one transition, to the second state with two transitions, and to the fourth state with two transitions, but to get to the third state it takes three transitions, which is not allowed. Similarly, beginning at k–2 in the –1 direction, one can go to states 5 and 8 with one transition, state seven with two transitions, but state 6 would require three transitions and so is not allowed. This means that using the MTR=2 code, three and six are mutually exclusive alternatives. This is demonstrated more readily in the signal space spatial representation of FIG. 7, where the states numbered 1–8 are plotted on the coordinates of $r_k$ and $r_{k-1}$. There it can be seen that while states 3 and 6 are superimposed, states 1, 2 and 4, indicated by the circles, lie on one side of the boundary created by segments E2, E4 and E3, and the states 5, 7 and 8 represented by the squares lie on the other side of that boundary. By eliminating boundary E4 and extending E3 up and providing boundary E1, then states 5, 7 and 8 are on one side of the boundary and states 1, 2 and 4, and now states 3 and 6 as well, are on the other side of the boundary.

It was thus realized that detector 30c, FIG. 9, could be built using four comparators 110, 112, 114 and 116, a logic circuit 118, a delay 120 and a discrete time filter 122. The input to discrete time filter 122, $r_k$, is developed into the expression $b_1 r_k + r_{k-1}$. This is delivered to comparator 116 and also to delay 120. At the output of delay 120 the signal now appears as $b_1 r_{k-1} + r_{k-2}$. Thus comparator 110 compares $b_1 r_{k-1} + r_{k-2}$ to $2b_1$ to determine the value E1. Comparator 112 also compares $b_1 r_{k-1} + r_{k-2}$ with zero to develop the value E2. Comparator 114 compares $b_1 r_{-1k} + r_{k-2}$ with $-2b_1$ to develop value E3, and comparator 116 compares $b_1 r_k + r_{k-1}$ with $b_1 r_{k-1} + r_{k-2}$ to develop value E4. The decision then in logic circuit 118 is simply:

IF $a_{k-3}$=+1 AND (E1 OR E4) AND E2

THEN $a_{k-2}$=1 ELSE $a_{k-2}$=–1 ps and

IF $a_{k-3}$=–1 AND (E4 AND E3) OR E2

THEN $a_{k-2}$=1 ELSE $a_{k-2}$=–1

Further simplification was effected by introducing a new variable $z_k = b_1 r_k + r_{k-1}$ or $z_k = (b_1 + D) r_k$ With this, the comparisons that need to be made in the detector become simply:

E1: $z_{k-1} > 2b_1$

E2: $z_{k-1} > 0$

E3: $z_{k-1} > -2b_1$

E4: $z_{k-1} > z_k$

Thus the full power of the tree search provided by an FDTS approach is provided with this invention but with an extremely simple implementation using no multipliers or integrators or adders, just four comparators, a simple logic circuit, a delay and a discrete time filter.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A constrained fixed delay tree search receiver for an MTR=2 encoded communication channel, comprising:

a filter circuit responsive to a received signal for producing a channel impulse response including a plurality of filtered samples with at least one of the post cursor filter samples forced to zero;

a feedback equalizer circuit responsive to a channel symbol identified at the output of the receiver and said filtered samples for producing corresponding truncated samples comprised of linear combinations of coefficients characterizing the channel and channel symbols constrained by the MTR=2 code; and a detector including a discrete time filter responsive to said truncated samples for generating a set of signals defining a multi-segment boundary which divides the combination of said set of signals into two groups; a comparator circuit, responsive to said discrete time filter, for determining to which of said groups said combination of said set of signals belongs; and a logic circuit, responsive to said comparator circuit, for determining a value of a channel symbol as a function of the group in which said set of symbols belongs.

2. The communication channel of claim 1 in which there are three said truncated samples.

3. The communication channel of claim 1 in which a post cursor truncated sample which is forced to zero is the most recent truncated sample.

4. The communication channel of claim 1 in which said channel symbols are binary.

* * * * *